(No Model.) 3 Sheets—Sheet 3.
J. BURNS.
VEGETABLE DIGGING MACHINE.
No. 495,017. Patented Apr. 11, 1893.
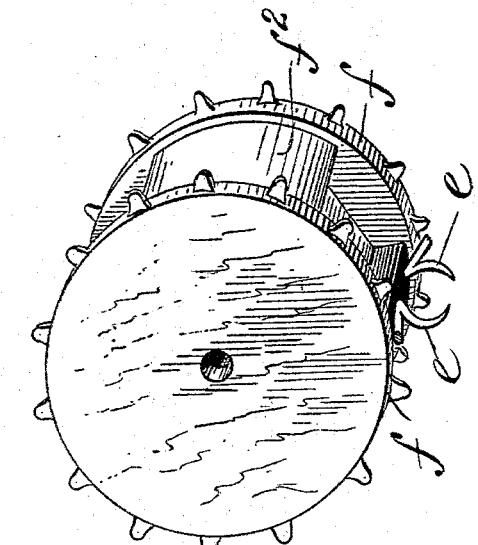
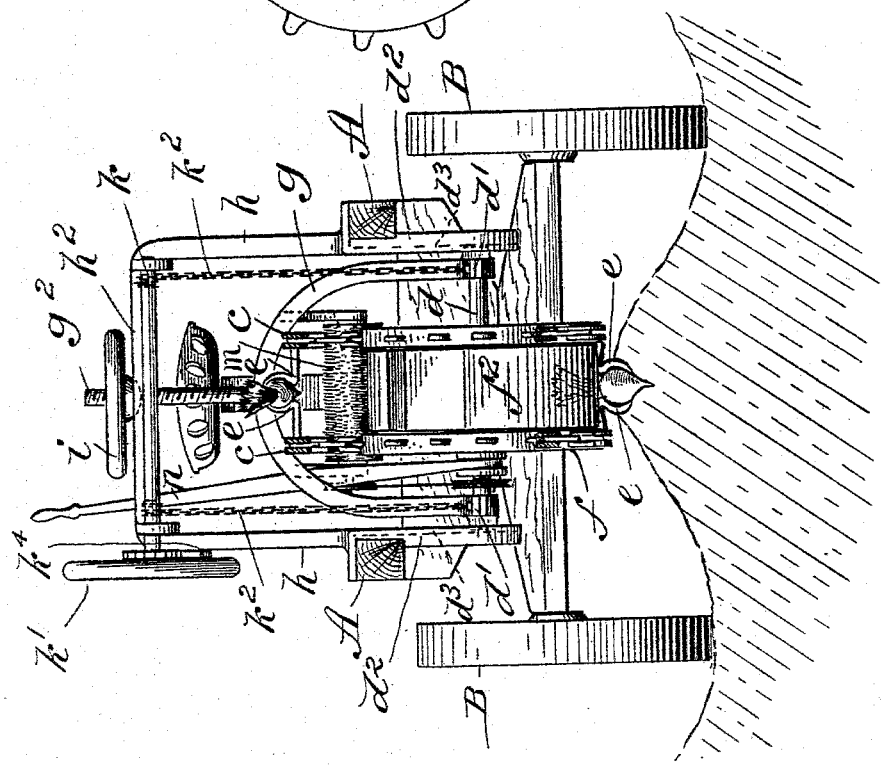
Witnesses:
J. D. Gasfield
T. F. Denum.
Inventor,
John Burns,
per Chapin & Co.
Attys

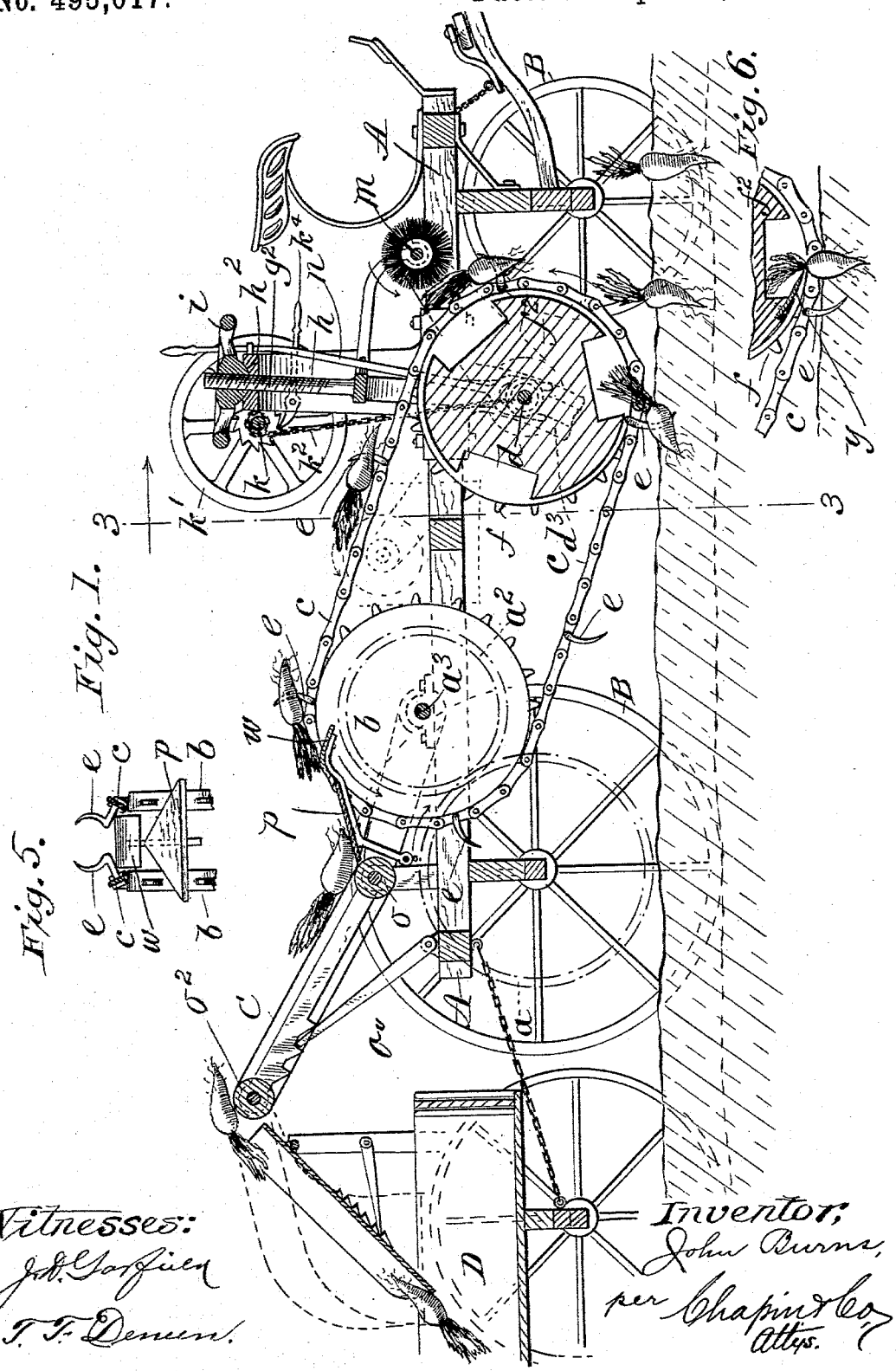

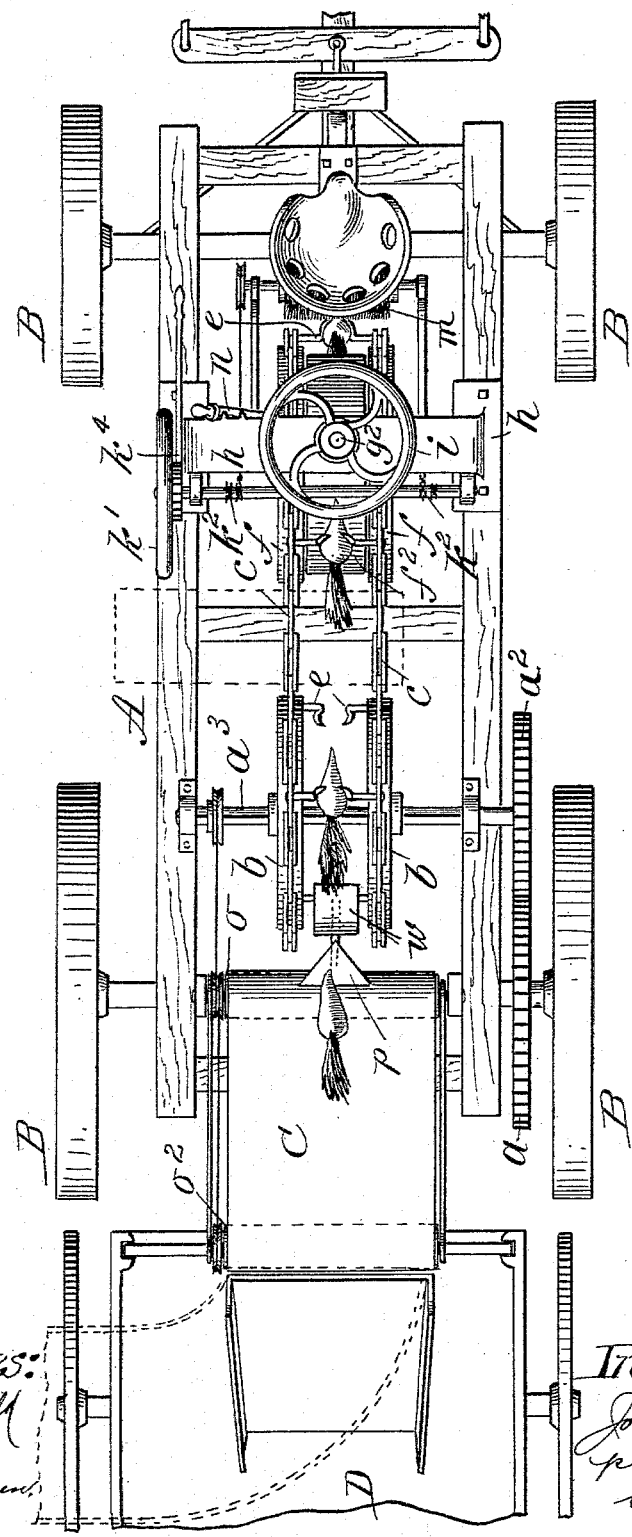

UNITED STATES PATENT OFFICE.

JOHN BURNS, OF LOS ANGELES, CALIFORNIA.

VEGETABLE-DIGGING MACHINE.

SPECIFICATION forming part of Letters Patent No. 495,017, dated April 11, 1893.

Application filed April 1, 1892. Serial No. 427,422. (No model.)

*To all whom it may concern:*

Be it known that I, JOHN BURNS, a citizen of the United States, residing at Los Angeles, in the county of Los Angeles and State of California, have invented new and useful Improvements in Vegetable-Digging Machines, of which the following is a specification.

The object of this invention is to improve automatic vegetable digging machines.

The improved machine is intended for digging bulbous vegetables which are grown in drills or rows, such for instance as beets, turnips, carrots, &c.

The present machine is designed to have capabilities for traveling along the row of vegetables and extracting the latter from the ground carrying them subject to the action of dirt removing devices thence to a vehicle or receptacle attached to or upon the rear part of the digging machine.

The invention is further designed to impart certain capabilities for actions to the mechanisms all as will be hereinafter rendered apparent.

The invention consists in constructions and combinations of parts all substantially as will hereinafter more fully appear and be set forth in the claims.

Referring to the accompanying drawings Figure 1 is a longitudinal sectional elevation of the digging machine and vegetable receiver all as in operative relations. Fig. 2 is a plan view of the machine. Fig. 3 is a vertical cross section and elevation as seen forwardly of the line 3—3, Fig. 1. Fig. 4 is a perspective view of one set of the sprocket wheels on which the vegetable engaging and extracting devices are movably supported. Fig. 5 is a detail view of the digging prongs and delivery board. Fig. 6, is a detail view of the recess in cylinder and the top cutting blade.

Similar letters of reference indicate corresponding parts in all of the views.

The digger embodies a carriage or vehicle, A, having forward and rear supporting and traction wheels, B B, and suitable draft appliances. Movable to rotate with the rear wheels is a gear wheel, $a$, which meshes into another gear wheel, $a^2$, that is fixed on a horizontal shaft horizontally supported for rotation in suitable bearings of the frame of the vehicle.

$b\ b$ represent a pair of spaced sprocket wheels mounted on said shaft, $a^3$, the same being shown as having spline-engagements therewith whereby said wheels are axially movable on the shaft. At the forward part of the machine there is another horizontal shaft, $d$, supported for rotation and having thereon the pair of splined sprocket wheels $f\!f$, around which and the sprocket wheels, $b$, are a pair of chains, $c\ c$, which have at suitable intervals oppositely paired prongs, $e\ e$, which are adapted in the working of the machine to enter the ground adjacent the beets or other vegetable, to have an engagement therewith and in their further movements to withdraw the vegetable from the ground carrying it upwardly and rearwardly for delivery finally upon the endless apron, C, rearwardly on which the vegetables will be conveyed into the wagon, D.

The shaft, $d$, on which the forward sprocket wheels are carried is mounted in bearings, $d'$, in the pending members of a yoke, $g$, which is movable substantially vertically and has means combined therewith for securing the raising and lowering thereof and the maintenance thereof in a raised or lowered position.

The frame of the carriage, A, at the forward portion thereof is provided with the cheek-plates, $d^2$, having the nearly vertical, although slightly curved ways, $d^3$, therein, in which the journals of the sprocket-shaft have guiding and steadying engagements. The said yoke, $g$, has the vertically extended spindle, $g^2$, which projects loosely through the horizontal cross member, $h^2$, of a supporting frame, $h$, rigidly fixed on the front of the digger carriage. The hand-wheel, $i$, has its hub screw-threaded and as a nut, engages the screw-threaded extremity of the spindle, $g^2$, which is projected above the cross beam, $h^2$, all whereby, on the turning of the said hand-wheel the yoke and the sprocket wheels and shaft carried thereby may be raised or lowered for regulating the course of travel and depth of penetration into the ground of the vegetable-engaging and extracting prongs.

The shaft, $d$, and the sprocket wheels thereon may be bodily raised well above the ground by the means applied to the yoke, $g$, for lifting same which means are independent of the adjusting device therefor constituted by the hand-wheel nut as aforesaid. For this purpose there is shown a shaft, $k$, horizontally mounted on the said frame, $h$, which is provided with the hand or crank wheel, $k'$. The chains or flexible connections, $k^2$, $k^2$, which have their lower ends connected to the journals, $d'$ $d'$, of the sprocket shaft, $d$, have their upper extremities in winding engagement with the said shaft, $k$. Therefore on going to or from the field the yoke and shaft carried thereby may be so far raised above the ground as to be free from engagement with any obstruction, and a restraining pawl or like device may be provided so that after the yoke has been raised it will prevent any retrograde movement of the shaft and lowering of the parts suspended thereby until released at will. Other elevating devices may be substituted for the chain as may be found desirable.

One or more brushes may be mounted adjacent the course of travel of the vegetable extractors and conveyers, one being shown at $m$, mounted in fixed bearings at the front of the machine and driven by belt and pulleys from the sprocket shaft, $d$. The brushing periphery will remove measurably the adhering dirt from the vegetable the transit of which is past the brush. If desired, one of the brushes may be mounted just under the upper course of the chain between the forward and rearward sprocket wheels, the same having a working accessibility to that portion of the vegetable which is not acted upon by the forward brush, $m$. This shaft or brush is indicated by dotted lines in Fig. 1.

The forward sprocket wheels, $f f$, are separated by an intermediate distance piece or block, $f^2$, which is suitably apertured so as to present no impediment to the upward projection and disposition of the vegetable tops between the sprocket wheels, and the said pair of sprocket wheels, $f f$, which are splined on the shaft, $d$, and are tied to move in unison have axial movements imparted thereto by the lever, $n$, which is intermediately thereof pivoted on the yoke, $g$, with one arm thereof extended into engagement with the grooved sprocket wheel hub, the other arm being upwardly or forwardly extended to an accessible point so that as the digging machine is driven with the wheels straddling the vegetable row, the digging appliances may be laterally adjusted to coincide with the possible inequalities in the direction of the rows, or the uneven driving of the vehicle. The peripheral portions of the said blocks, $f^2$, adjacent the apertures serve to reinforce the prongs especially while the latter are being thrust into the ground for engagement with the beets.

A light wagon, which is in part shown in the drawings, is understood as being a detachable trailer for the main vehicle. The endless apron, C, has its forward portion around a roller $o$, which is mounted on the main frame, A, and by suitable means caused to rotate at a suitable speed by belt and pulley $o$ or other equivalent connections between said roll and the shaft, $a^3$, or suitably otherwise. The rear roller, $o^2$, for the said endless apron, C, is carried in journals, $o^3$, which are mounted on a suitable frame therefor. The frame shown is adapted to be inclined rearwardly and upwardly and retained by the stay-bar, $o^4$, and the apron, C, rearwardly delivers into a chute which is supported at the forward part of the wagon. The chute may have its downward and rearward inclination changed at pleasure so that when the receiver wagon becomes sufficiently loaded at one place, the incoming vegetables may be variously distributed.

Between the course of the carrier chains around the upper rear portion of the rear sprocket wheels there is a deflecting or transferring board or device, $p$, which tends to direct the rearwardly traveling beets onto the endless apron which thence delivers them into the receptacle of the rear wagon, D.

In Figs. 1, 2, and 5, at $w$, is indicated a plate or member between the chains at a rearward part of their course, which is inclined from below to above the normal plane of travel of the chain and the prongs thereon. The prongs, coming into engagements, by their shank portions, which extend laterally from the chains, with said plate are upwardly and outwardly forced the prongs receding from each other, as most particularly seen in Fig. 5. The relations of the prongs above set forth are permitted by the torsional yielding of the chain.

In Fig. 6 a cutter blade is shown on the rotating block in advance of the chain carried extracting prong whereby the top of the vegetable is removed before the bulb is taken up.

While this machine is of unusual utility in the digging of beets on plantations where they are extensively raised it is of course not to be understood that the use of the machine is confined to the digging of this particular vegetable, for it will be apparent that it may be readily adapted for the digging of many other kinds of bulbous vegetables which are usually grown in straight drills and of a substantially uniform size.

I claim—

1. In a vegetable digging machine, in combination, a vehicle, a pair of endless sprocket chains having vegetable engaging clips or prongs, pairs of support and drive wheels for said chains rotatably mounted on the vehicle and the forward pair movable transversely of the direction of travel of the vehicle, and means for insuring the transverse movements as desired, whereby the digging prongs may be adjusted during the travel of the vehicle to alignment with the row of vegetables, substantially as described.

2. In a vegetable digging machine, in combination, a vehicle having two pairs of sprocket wheels and prong-provided chains around and supported by said wheels, and an apertured body between the forward pair of sprocket wheels, substantially as and for the purposes set forth.

3. In a vegetable digging machine the combination with a vehicle, having a pair of separated chains with opposing vegetable engaging prongs and opposing pairs of sprocket wheels for supporting and driving said chains in unison, the forward pair of said sprocket wheels having a position near the ground, of a rotary brush located with a peripheral portion thereof in the course of travel of said chain-carried prongs, all whereby a vegetable extracted and conveyed by the traveling chain-supported prongs will thereby be carried subject to the action of the brush, substantially as described.

4. In a vegetable digging machine, in combination, a vehicle, a pair of prong-provided chains, sprocket wheels therefor, a vertically bodily movable frame supporting the forward pair of sprocket wheels and having an upwardly extended screw threaded spindle, a fixed nut for engaging the spindle which is itself engaged for its support by a part of said frame, substantially as described.

5. In a machine for digging bulbous vegetables, in combination, a vehicle having chain-carried extracting-prongs, and a cutter for severing the tops of the vegetables, substantially as set forth.

6. The combination, in a vegetable digging machine with a pair of endless sprocket chains having series of opposing clips or prongs, of a supporting carriage therefor, means for imparting a progressing movement to the chain, a wheeled receptacle adapted to be connected at the rear of the main carriage, an endless apron between said chains and the rear receptacle and means for causing the prongs as they come adjacent the apron to separate the one from the other, for the release of the vegetables, substantially as described.

7. In a vegetable digging machine, the combination with a supporting vehicle having wheels, of the gear, $a$, receiving its rotation from one of said wheels, a shaft, $a^3$, having the gear, $a^2$, thereon, and the sprocket wheel, $b, b$, and another shaft, $d$, forwardly thereof having the sprocket wheels, $f, f$, and a support which is vertically movable independent of said shaft, $a^3$, in an arc-line generated therefrom, and the prong-carrying chains, $c, c$, substantially as and for the purposes described.

8. The combination with a vegetable digging machine having endless traveling chains with vegetable extracting prongs, a wheeled receptacle detachably connected at the rear of the machine, a roller mounted at the rear of the course of travel of the chains and another roller adjustably mounted over the front of the said wheeled receptacle, the endless apron supported by and running around said rolls, and means for imparting travel thereto, substantially as described.

JOHN BURNS.

Witnesses:
F. E. LOWRY,
A. W. SEAVER.